(No Model.)
C. CALLAHAN.
Refrigerator.
No. 235,068. Patented Dec. 7, 1880.
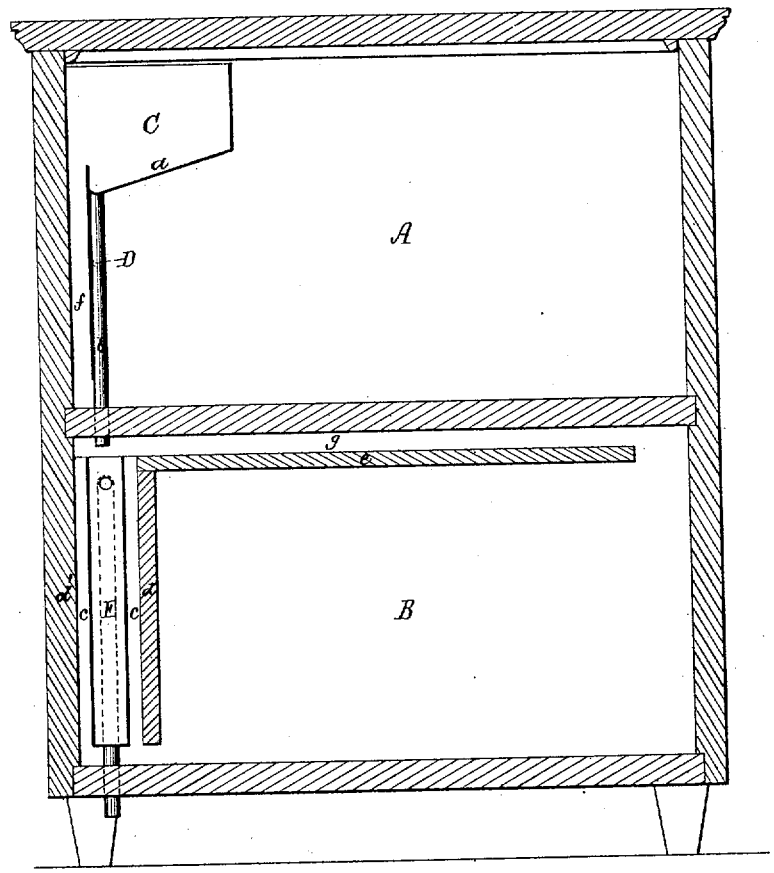
Witnesses.
S. N. Piper
Wm W Hunt
Inventor.
Charles Callahan.
by R. H. Eddy, atty.

UNITED STATES PATENT OFFICE.

CHARLES CALLAHAN, OF LOWELL, MASSACHUSETTS.

REFRIGERATOR.

SPECIFICATION forming part of Letters Patent No. 235,068, dated December 7, 1880.

Application filed August 11, 1880. (No model.)

*To all whom it may concern:*

Be it known that I, CHARLES CALLAHAN, of Lowell, of the county of Middlesex and State of Massachusetts, have invented a new and useful Improvement in Refrigerators; and I do hereby declare the same to be described in the following specification and represented in the accompanying drawing, which is a vertical section of a refrigerator of my improved kind.

The nature of my improvement is defined in the claims hereinafter presented.

The object of the invention is to utilize the water that results from the melting of the ice—that is to say, to make use of such water for cooling the air in an apartment or chamber separate from that in which the ice-receiver is placed—and I accomplish such by means as hereinafter described, and as shown by the drawing.

In the said drawing, A and B denote two separate refrigerators or air-cooling chambers, one being over or above the other. In the upper part of the upper one of them is the ice-receiving trough C, whose bottom $a$ is inclined and terminates against a vertical partition, D. This partition is placed at a short distance from and parallel to the next adjacent side of the chamber, but does not extend to the bottom thereof. The partition rises a short distance above the bottom of the trough, and there is led from the said bottom down into the lower chamber an educt or pipe, $b$, to discharge from the trough the water that results from melting of the ice. The educt is to terminate directly over and to open into a deep and very narrow tank, E, which is placed within the lower chamber and at a short distance from its next adjacent side. The bottom of the tank is above the bottom of the chamber in order that air may freely circulate over and under the tank and down through the narrow spaces $c\ c$, that are between the tank and the side $d'$ of the chamber and a partition, $d$, therein. Each chamber is to be provided with suitable means of gaining access to it for the purpose of placing articles in it or removing them from it, as occasion may require, and, if desirable, each chamber may have air-spaces or suitable non-conducting material or materials arranged in its sides or walls, as is the usual custom in constructing refrigerators.

It is not essential to my invention that one chamber should be entirely over the other, as it may be partly so or be otherwise disposed so long as the ice-receiving chamber is above the chamber containing the water-tank.

At its upper part the tank may be provided with a pipe or educt to discharge from it out of the chamber the surplus water, in order for the water in the tank to be kept from filling it and flowing into the chamber.

From the above it will be seen that the air in the upper chamber will be caused to circulate therein and down through and out of the passage $f$ leading down from the ice-receptacle, and in so doing the air will have its heat more or less abstracted by the ice, and will be cooled thereby. As the ice may melt, the water escaping from it will pass through the educt or pipe and into the tank in the lower chamber. The said tank will be cooled by such water, and there will be created in the lower chamber a circulation of the air thereof around such tank, whereby the temperature of such air will be lowered or maintained sufficiently low to preserve from decay any edible article or drinkable liquid placed in such chamber.

Besides the vertical partition $d$, there is in the chamber B, at its upper part, a horizontal partition, $e$, the two partitions being arranged with the top of the chamber and the tank E in manner as shown, whereby a passage, $g$, is formed to open into the passages $c\ c$ or space in which the tank E is placed. The warmer air of the chamber B will pass into and through the passage $g$, and thence down the passages $c\ c$, and be cooled by the tank.

I claim—

1. The combination of the refrigerating-chamber A, provided with the ice receptacle or trough C, the educt $b$, and the air-passage $f$, with the cooling-chamber B, having the narrow water-tank E arranged in it, as set forth, all being arranged and to operate substantially as described.

2. The combination of the refrigerating-chamber A, provided with the ice receptacle or trough C, the tube $b$, and the air-passage $f$, with the cooling-chamber B, having the narrow water-trough E and the two partitions $d\ e$ arranged in it, (the said chamber,) and to operate substantially as described.

CHARLES CALLAHAN.

Witnesses:
R. H. EDDY,
WM. W. LUNT.